United States Patent
Bialer et al.

(10) Patent No.: US 11,762,086 B2
(45) Date of Patent: Sep. 19, 2023

(54) GENERATING A HIGH FREQUENCY FMCW RADAR FROM LOW FREQUENCY FMCW RADAR

(71) Applicant: GM GLOBAL TECHNOLOGY OPERATIONS LLC, Detroit, MI (US)

(72) Inventors: Oded Bialer, Petah Tivak (IL); Igal Kotzer, Tel Aviv (IL); Amnon Jonas, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 263 days.

(21) Appl. No.: 17/189,572

(22) Filed: Mar. 2, 2021

(65) Prior Publication Data
US 2022/0283297 A1   Sep. 8, 2022

(51) Int. Cl.
*G01S 13/931* (2020.01)
*G01S 13/58* (2006.01)
*G01S 13/34* (2006.01)

(52) U.S. Cl.
CPC .......... *G01S 13/931* (2013.01); *G01S 13/347* (2013.01); *G01S 13/584* (2013.01)

(58) Field of Classification Search
CPC .... G01S 13/931; G01S 13/347; G01S 13/343; G01S 13/345; G01S 13/584; G01S 7/35
USPC .................................................. 342/70, 175
See application file for complete search history.

(56) References Cited

U.S. PATENT DOCUMENTS

| | | | | |
|---|---|---|---|---|
| 5,381,153 A * | 1/1995 | Saito | ............ | G01S 7/35 342/112 |
| 5,546,088 A * | 8/1996 | Trummer | ............ | G01S 13/343 342/135 |
| 5,659,321 A * | 8/1997 | Burger | ............ | H03D 9/06 342/124 |
| 6,433,730 B1* | 8/2002 | Borla | ............ | G01S 7/2922 342/197 |
| 6,700,531 B2* | 3/2004 | Abou-Jaoude | ............ | G01S 7/4052 342/165 |
| 6,724,523 B2* | 4/2004 | Yap | ............ | H04B 10/25752 330/3 |
| 7,024,165 B2* | 4/2006 | Stepp | ............ | H04B 1/00 455/81 |
| 7,107,015 B2* | 9/2006 | Stepp | ............ | H04B 1/00 455/81 |
| 7,359,672 B2* | 4/2008 | Lynch | ............ | H03D 7/00 257/471 |
| 7,605,748 B2* | 10/2009 | Fehrenbach | ............ | G01S 7/282 342/123 |

(Continued)

*Primary Examiner* — Vladimir Magloire
*Assistant Examiner* — Michael W Justice
(74) *Attorney, Agent, or Firm* — CANTOR COLBURN LLP (57) ABSTRACT

A vehicle, radar system for a vehicle and a method of detecting a parameter of an object is disclosed. The radar system includes a base radar and a frequency converter. The base radar generates a first frequency source signal within a first frequency range and is receptive to a first frequency reflected signal within the first frequency range. The base radar is configured to determine a parameter of an object from the first frequency reflected signal. The frequency converter is configured to convert the first frequency source signal to a second frequency source signal within a second frequency range and to convert a second frequency reflected signal within the second frequency range to the first frequency reflected signal.

11 Claims, 4 Drawing Sheets

(56) References Cited

U.S. PATENT DOCUMENTS

| | | | |
|---|---|---|---|
| 10,649,013 B2* | 5/2020 | Fujiwara | H03D 7/00 |
| 10,763,872 B1* | 9/2020 | Wang | G01S 13/88 |
| 11,348,380 B2* | 5/2022 | Fang | G07C 5/008 |
| 2003/0022652 A1* | 1/2003 | Stepp | H04B 1/406 |
| | | | 455/323 |
| 2003/0090777 A1* | 5/2003 | Yap | H01Q 3/2676 |
| | | | 359/333 |
| 2004/0012517 A1* | 1/2004 | Abou-Jaoude | G01S 7/4052 |
| | | | 342/171 |
| 2005/0255821 A1* | 11/2005 | Stepp | H04B 1/406 |
| | | | 455/323 |
| 2007/0155355 A1* | 7/2007 | Lynch | H03D 7/00 |
| | | | 455/323 |
| 2008/0024354 A1* | 1/2008 | Fehrenbach | G01S 7/03 |
| | | | 342/124 |
| 2019/0271773 A1* | 9/2019 | Blödt | H03K 5/00006 |
| 2019/0378356 A1* | 12/2019 | Fang | G07C 5/008 |
| 2020/0295770 A1* | 9/2020 | Wang | H04L 27/22 |

* cited by examiner

GENERATING A HIGH FREQUENCY FMCW RADAR FROM LOW FREQUENCY FMCW RADAR

INTRODUCTION

The subject disclosure relates to a system and method for radar detection, and in particular to a system and method for converting radar signals between a low frequency range and a high frequency range to perform radar detection with increased resolution.

A radar system can be used in a vehicle in order to determine the location and velocity of various objects within the surroundings of the vehicle. The radar system generally sends out a radio frequency (RF) source signal, receives a reflection of the source signal from an object and determines parameters such as range, velocity, angular location, etc. of the object from a comparison of the source signal and the reflected signal. The resolution of the radar system can be increased by increasing the operating frequency of the source signal of the radar system. However, for a vehicle with an existing radar system, increasing the resolution requires replacing the existing radar system with a radar system having a higher operating frequency, which can be costly and labor intensive. Accordingly, it is desirable to provide a method of increasing an operating frequency of an existing radar system.

SUMMARY

In one exemplary embodiment, a method of detecting a parameter of an object is disclosed. A first frequency source signal is obtained within a first frequency range. A second frequency source signal is generated within a second frequency range from the first frequency source signal. A first frequency reflected signal is generated within the first frequency range from a second frequency reflected signal within the second frequency range, wherein the second frequency reflected signal is indicative of a reflection of the second frequency source signal from the object. The parameter of the object is determined from the first frequency reflected signal.

In addition to one or more of the features described herein, the method further includes generating a reference signal within a third frequency range from the first frequency source signal and combining the reference signal with the second frequency reflected signal to generate the first frequency reflected signal. The first frequency reflected signal is a difference signal obtained by multiplication of the reference signal and the second frequency reflected signal. The second frequency range is greater than the first frequency range and the third frequency range is between the first frequency range and the second frequency range. The method further includes generating a plurality of harmonic signals from the first frequency source signal, selecting from the plurality of harmonic signals a harmonic signal within the second frequency range as the second frequency source signal and selecting from the plurality of harmonic signals another harmonic signal within the third frequency range as the reference signal. The first frequency source signal is a linear frequency modulation (LFM) signal in the first frequency range bounded by a lower bound frequency $B_1$ and an upper bound frequency $B_2$, the second frequency source signal is an LFM signal in the second frequency range bounded by $N*B_1$ and $N*B_2$, and the reference signal is an LFM signal in the third frequency range bounded by $(N-1)*B_1$ and $(N-1)*B_2$. The parameter of the object is at least one of a range of the object, a relative radial velocity of the object, an azimuthal location of the object, and an elevation of the object.

In another exemplary embodiment, a radar system for a vehicle is disclosed. The radar system includes a base radar and a frequency converter. The base radar generates a first frequency source signal within a first frequency range and is receptive to a first frequency reflected signal within the first frequency range. The base radar is configured to determine a parameter of an object from the first frequency reflected signal. The frequency converter is configured to convert the first frequency source signal to a second frequency source signal within a second frequency range and to convert a second frequency reflected signal within the second frequency range to the first frequency reflected signal.

In addition to one or more of the features described herein, the frequency converter is further configured to generate a reference signal within a third frequency range from the first frequency source signal and to combine the reference signal with the second frequency reflected signal to generate the first frequency reflected signal. The first frequency reflected signal is a difference signal obtained by multiplying the reference signal and the second frequency reflected signal. The second frequency range is greater than the first frequency range and the third frequency range is between the first frequency range and the second frequency range. The frequency converter further includes an amplifier circuit configured to generate a plurality of harmonic signals from the first frequency source signal, a filter circuit configured to apply a first filter to the plurality of harmonic signals to select an Nth harmonic signal in the second frequency range as the second frequency source signal and a reference signal circuit configured to apply a second filter to the plurality of harmonic signals to select an (N-1)th harmonic signal within the third frequency range as the reference signal. The first frequency source signal is a linear frequency modulation (LFM) signal in the first frequency range bounded by a lower bound frequency $B_1$ and an upper bound frequency $B_2$, the second frequency source signal is an LFM signal in the second frequency range bounded by $N*B_1$ and $N*B_2$, and the reference signal is an LFM signal in the third frequency range bounded by $(N-1)*B_1$ and $(N-1)*B_2$. The parameter of the object is at least one of a range of the object, a relative radial velocity of the object, an azimuthal location of the object, and an elevation of the object.

In another exemplary embodiment, a vehicle is disclosed. The vehicle includes a base radar and a frequency converter. The base radar generates a first frequency source signal within a first frequency range and is receptive to a first frequency reflected signal within the first frequency range. The base radar is configured to determine a parameter of an object from the first frequency reflected signal. The frequency converter is configured to convert the first frequency source signal to a second frequency source signal within a second frequency range and to convert a second frequency reflected signal within the second frequency range to the first frequency reflected signal.

In addition to one or more of the features described herein, the frequency converter is further configured to generate a reference signal within a third frequency range from the first frequency source signal and to combine the reference signal with the second frequency reflected signal to generate the first frequency reflected signal. The first frequency reflected signal is a difference signal obtained by multiplying the reference signal and the second frequency reflected signal. The second frequency range is greater than the first frequency range and the third frequency range is between the first frequency range and the second frequency range. The frequency converter further includes an amplifier circuit configured to generate a plurality of harmonic signals from the first frequency source signal, a filter circuit configured to apply a first filter to the plurality of harmonic signals to select an Nth harmonic signal in the second frequency range as the second frequency source signal and a reference signal circuit configured to apply a second filter to the plurality of harmonic signals to select an (N−1)th harmonic within the third frequency range as the reference signal. The first frequency source signal is a linear frequency modulation (LFM) signal in the first frequency range bounded by a lower bound frequency $B_1$ and an upper bound frequency $B_2$, the second frequency source signal is an LFM signal in the second frequency range bounded by $N*B_1$ and $N*B_2$, and the reference signal is an LFM signal in the third frequency range bounded by $(N-1)*B_1$ and $(N-1)*B_2$.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
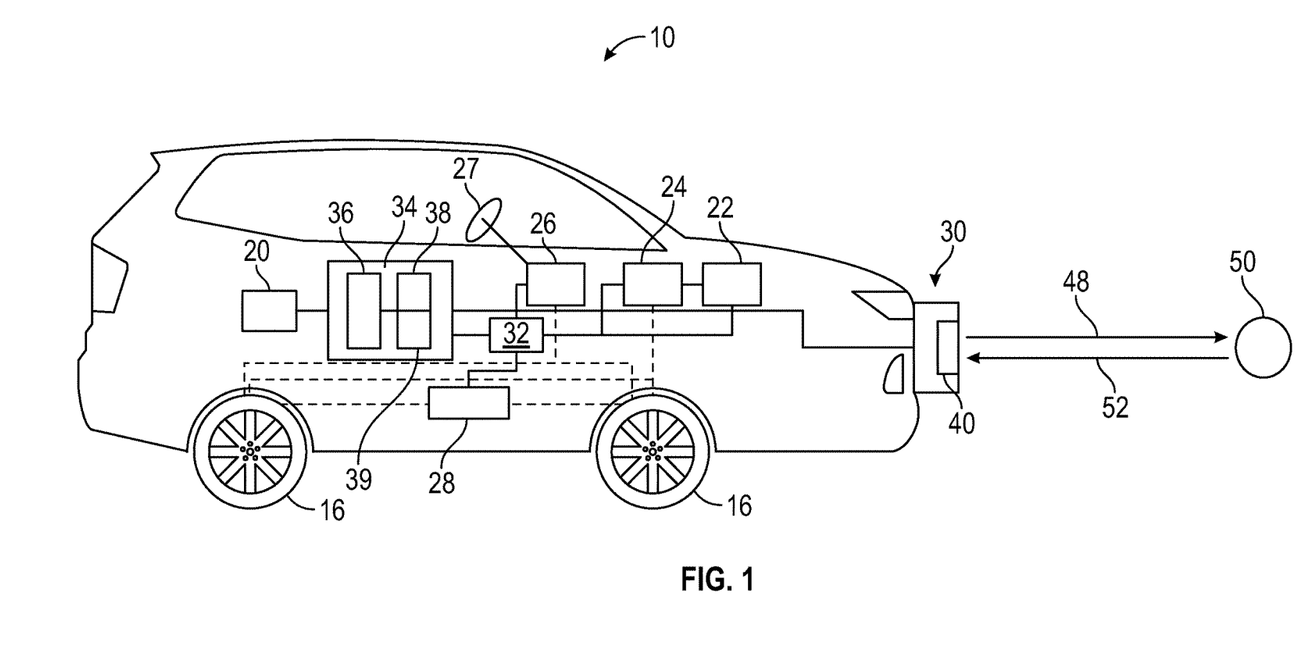
FIG. 1 shows an autonomous vehicle, in an embodiment.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of Levels One through Five.

The autonomous vehicle 10 generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes a radar system 40 that senses objects in an exterior environment of the autonomous vehicle 10 and determines various parameters of the objects useful in locating the position and relative velocities of various remote vehicles in the environment of the autonomous vehicle. Such parameters can be provided to the controller 34. In operation, the radar system 40 sends out a radio frequency (RF) source signal 48 that is reflected back at the autonomous vehicle 10 by one or more objects 50 in the field of view of the radar system 40 as one or more echo signals or reflection signals 52, which are received at the radar system 40. The one or more reflection signals 52 can be used to determine various parameters of the one or more objects 50, such as a range of the object, Doppler frequency or relative radial velocity of the object, azimuth, elevation, etc. The sensor system 30 can include additional sensors, such as digital cameras, for identifying road features, Lidar, etc.

The controller 34 builds a trajectory for the autonomous vehicle 10 based on the output of sensor system 30. The controller 34 can provide the trajectory to the actuator system 32 to control the propulsion system 22, transmission system 24, steering system 26, and/or brake system 28 in order to navigate the autonomous vehicle 10 with respect to the one or more objects 50 based on the determined parameters.

The controller 34 includes a processor 36 and a computer readable storage device or storage medium 38. The computer readable storage medium includes programs or instructions 39 that, when executed by the processor 36, operate the autonomous vehicle 10 based on outputs of the sensor system 30. The storage medium 38 may further include programs or instructions 39 that when executed by the processor 36, determines the parameters of the one or more objects 50 in order to allow the autonomous vehicle to navigate with respect the one or more objects 50.

Figure 2:
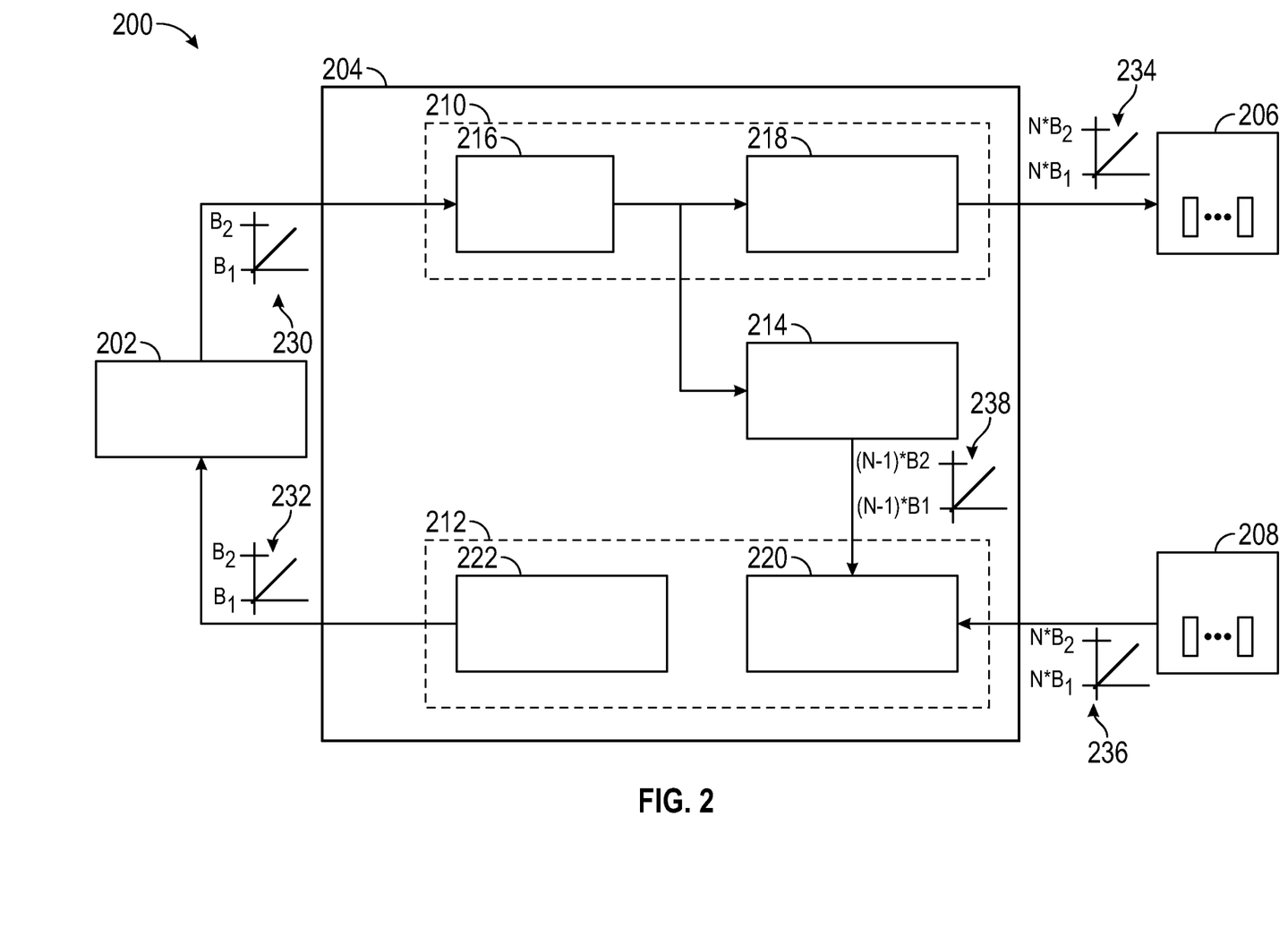
FIG. 2 schematically illustrates a high frequency radar system, in an embodiment.

FIG. 2 schematically illustrates a high frequency radar system 200, in an embodiment. The high frequency radar system 200 includes a base radar system 202 operating in a first frequency range (i.e., a low frequency range), a frequency converter 204, a transmitter 206 and a receiver 208. The base radar system 202 can be an existing radar system of the autonomous vehicle 10, and the transmitter 206 and receiver 208 can be existing antennae of the vehicle. The transmitter 206 can include a plurality of transmitters and the receiver 208 can include a plurality of receivers. The frequency converter 204 can be introduced between the base radar system 202 and the transmitter 206 and receiver 208 to convert signals back and forth between the first frequency range of the base radar system 202 and a second frequency range (i.e., a high frequency range).

The base radar system 202 generates a first frequency source signal $S_1$ that falls within the first frequency range, receives a first frequency reflected signal $R_1$ that falls within the first frequency range, and determines the parameter of the one or more objects 50 from the first frequency source signal $S_1$ and the first frequency reflected signal $R_1$. The first frequency range is bounded by a lower bound frequency $B_1$ and an upper bound frequency $B_2$, as shown by first chart 230 and second chart 232. The first frequency source signal $S_1$ is a frequency modulated continuous wave signal (FMCW signal), also known as a chirp signal, that increases linearly in frequency with time, starting at the lower bound frequency $B_1$ and ending at the upper bound frequency $B_2$. The first frequency reflected signal $R_1$ is also an FMCW signal that falls between the lower bound frequency $B_1$ and the upper bound frequency $B_2$. In general, multiple chirp signals can be transmitted in a sequence extending over a period of time, in various embodiments.

The frequency converter 204 converts the first frequency source signal $S_1$ to a second frequency source signal $S_2$ within a second frequency range that is a higher frequency range than the first frequency range. The second frequency source signal $S_2$ is sent to the transmitter 206 where it is transmitted into the environment. The source frequency source signal $S_2$ is reflected off of the one or more objects 50 to generate a second frequency reflected signal $R_2$ that is in the second frequency range. The second frequency reflected signal $R_2$ is received at the receiver 208. The frequency converter 204 converts the second frequency reflected signal $R_2$ from the second frequency range to the first frequency range to obtain the first frequency reflected signal $R_1$. The first frequency reflected signal $R_1$ is received at the base radar system 202 for processing and determining of parameters of the one or more objects 50.

The frequency converter 204 includes an up-conversion channel 210, a down-conversion channel 212 and a reference signal circuit 214. The up-conversion channel 210 includes an amplifier circuit 216 and an up-conversion filter circuit 218. The amplifier circuit 216 is a non-linear radio frequency (RF) amplifier, which can be an RF amplifier operating in a non-linear or saturated range. In one embodiment, the non-linear RF amplifier is a diode. The amplifier circuit 216 generates a plurality of harmonic signals from the first frequency source signal $S_1$. The frequencies of the harmonic signals are integer multiples of the base frequency (i.e., the frequency of the first frequency source signal $S_1$).

The up-conversion filter circuit 218 applies a first band-pass filter to the plurality of harmonic signals to select a harmonic signal that falls within the second frequency range. The selected harmonic signal is output from the up-conversion filter circuit 218 as the second frequency source signal $S_2$. The first band pass filter is centered at the $N^{th}$ harmonic signal, where $N>2$ ($N=1$ is the fundamental signal or the first frequency source signal $S_1$). Therefore, the second frequency source signal $S_2$ is a chirp signal having a lower bound frequency of $N*B_1$ and an upper bound frequency of $N*B_2$, as shown in third chart 234. Consequently, the second frequency reflection signal $R_2$ is within lower bound frequency of $N*B_1$ and an upper bound frequency of $N*B_2$, as shown in fourth chart 236.

The plurality of harmonics is also sent from the amplifier circuit 216 to the reference signal circuit 214 to generate a reference signal $S_{ref}$. The reference signal circuit 214 applies a second bandpass filter to the plurality of harmonic signals. The second bandpass filter is centered at a harmonic frequency that is one less than the second frequency source signal $S_2$. In other words, since the first band pass filter selects the $N^{th}$ harmonic signal, the second bandpass filter therefore selects the $(N-1)^{th}$ harmonic signal. As a result, the reference signal $S_{ref}$ is a chirp signal having a lower bound frequency of $(N-1)*B_1$ and an upper bound frequency of $(N-1)*B_2$, as shown in fifth chart 238.

The down-conversion channel 212 includes a mixing circuit 220 and a down-conversion filter circuit 222. The mixing circuit 220 combines the reference signal with the signal received at the receiver 208 (i.e., the second frequency reflected signal $R_2$). The mixing circuit 220 multiplies the reference signal $S_{ref}$ with the second frequency reflected signal $R_2$, thereby generating at least a summation signal and a difference signal, both of which are sent to the down-conversion filter circuit 222. The difference signal is within the first frequency range (i.e., between $B_1$ and $B_2$). The down-conversion filter circuit 222 applies a third band-pass filter that is centers at the fundamental frequency (i.e., $N=1$), thereby selecting the difference signal. The selected signal is sent to the base radar system 202, which recognizes the difference signal as the first frequency reflected signal $R_1$.

Figure 3:
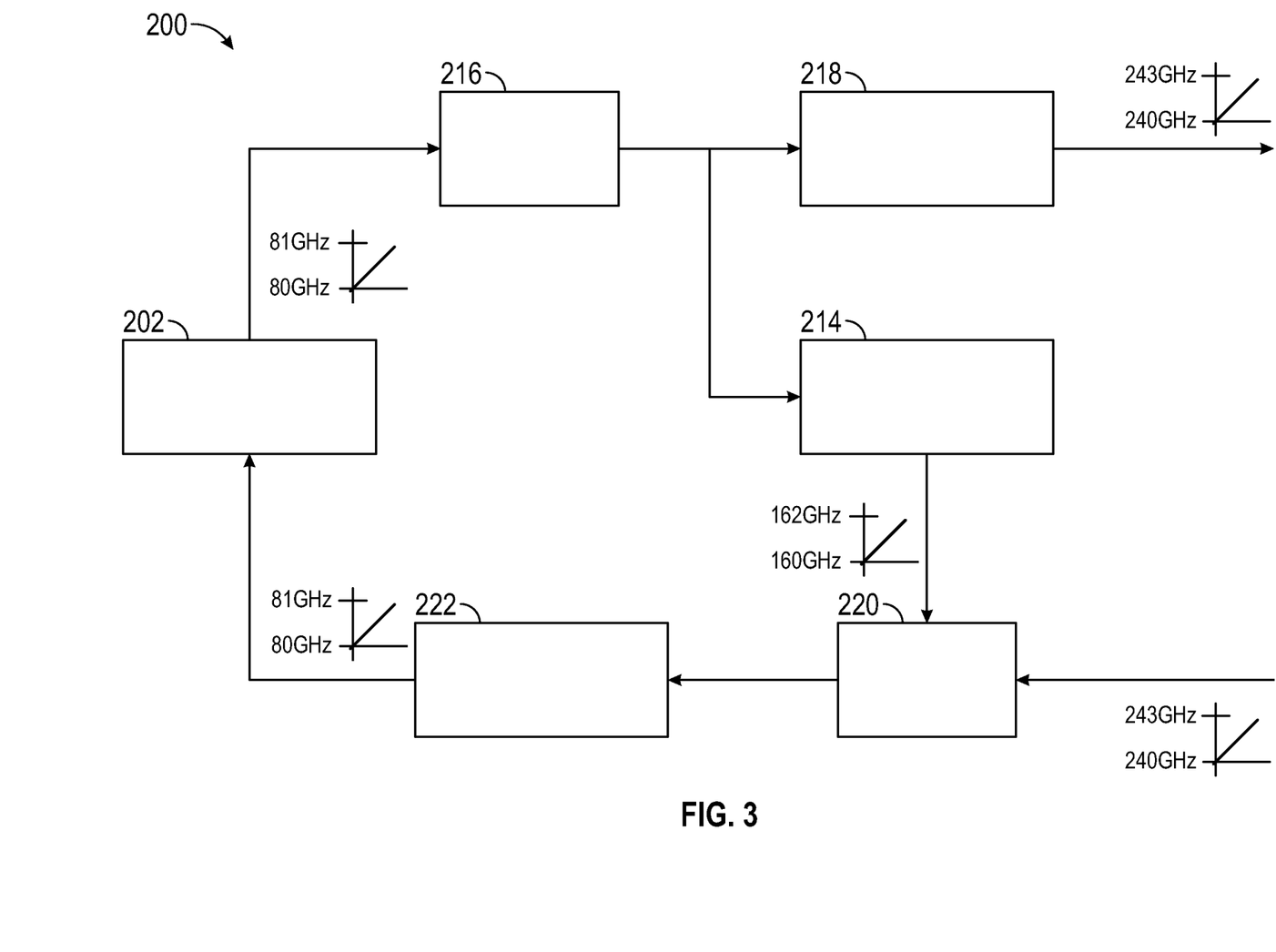
FIG. 3 shows the high frequency radar system in a selected embodiment.

FIG. 3 shows the high frequency radar system 200 in a selected embodiment. The high frequency radar system 200 transmits signals at 240 Gigahertz (GHz) using signals from the base radar system 202 operating at 80 GHz. The base radar system 202 generates a low-frequency chirp signal (i.e., first frequency source signal $S_1$) within a frequency range having a lower bound frequency of 80 GHz and an upper bound frequency of 81 GHz. Upon generation of the plurality of harmonics at the amplifier circuit 216 and filtering of the harmonics at the up-conversion filter circuit 218, the second frequency source signal $S_2$ operates within a frequency range having a lower bound frequency of 240 GHz and an upper bound frequency of 243 GHz. The reference signal selected by the second band pass filter operates in a frequency range having a lower bound frequency of 160 GHz and an upper bound frequency of 162 GHz. The second frequency reflected signal $R_2$ is within a frequency range having a lower bound frequency of 240 GHz and an upper bound frequency of 243 GHz. The first frequency reflected signal $R_1$ obtained by multiplying the second frequency reflected signal $R_2$ with the reference signal $S_{ref}$ and filtering the product at the down-conversion filter circuit 222 is in a frequency range having a lower bound frequency of 80 GHz and an upper bound frequency of 81 GHz.

Figure 4:
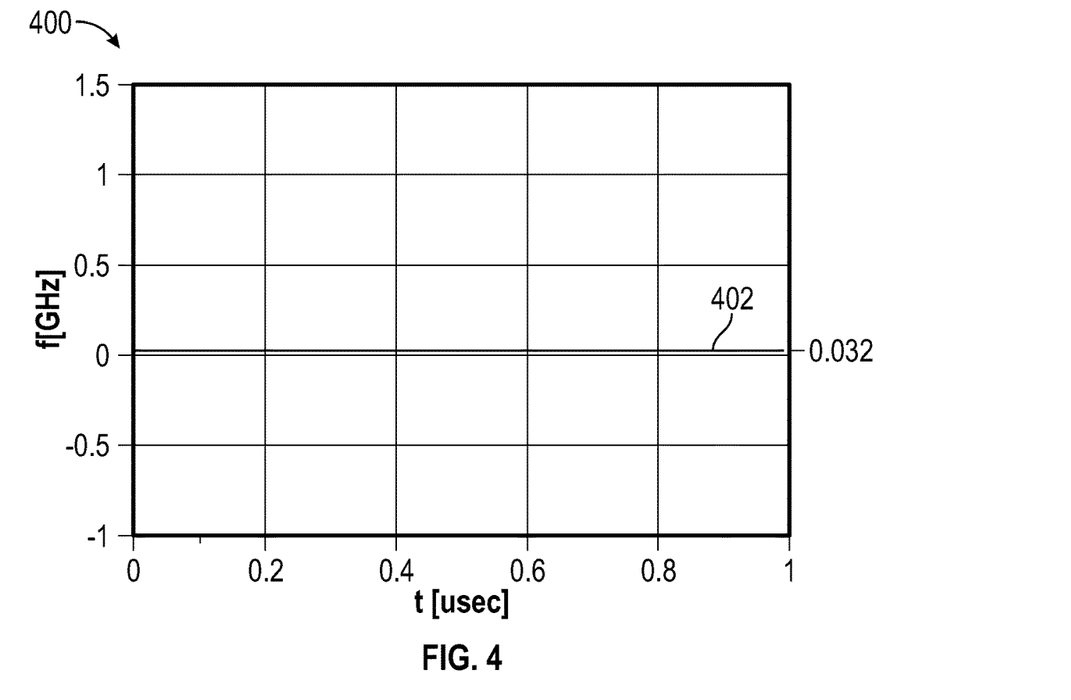
FIG. 4 shows a graph of a signal response in the time domain obtained using the methods disclosed herein to determine a target at a selected distance of forty meters.

FIG. 4 shows a graph 400 of a signal response in the time domain obtained using the methods disclosed herein to determine a target at a selected distance of forty meters. The graph 400 shows time along the x-axis in microseconds and frequency along the y-axis in GHz. Operation of the high frequency radar system 200 generates the signal response 402 at a single frequency that is proportional to the target range. For the illustrative embodiment, the frequency of the signal response is about 0.032 GHz.

Figure 5:
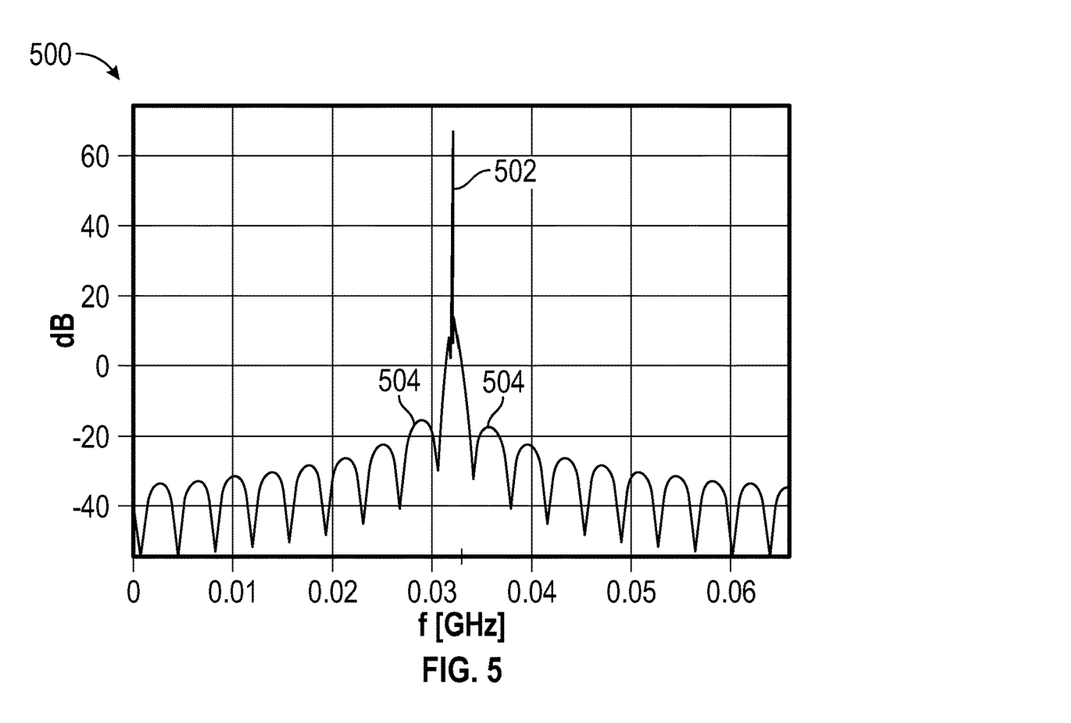
FIG. 5 shows a graph of a frequency distribution in frequency space for the signal response of FIG. 4.

FIG. 5 shows a graph 500 of a frequency distribution in frequency space for the signal response 402 of FIG. 4. The frequency distribution includes a central peak 502 located at 0.032 GHz having an intensity of about 70 decibels (dB). Various side lobes (e.g., side lobes 504) surrounding the central peak 502 are less than about −15 dB. Therefore, the signal response 402 has a high signal-to-noise ratio.

While the high frequency radar system 200 is discussed herein can be used to determine a range or location of an object, additional parameters such as azimuth, elevation and Doppler (or object velocity) can be determined using the high frequency radar system using known methods. In addition, a second frequency converter can be coupled between the frequency converter 204 and the transmitter 206 and receiver 208 in order to produce a radar system that operates in higher frequency range higher than that provided by the frequency converter 204 (i.e., higher than 240 GHz for the illustrative example of FIG. 3). This additional frequency converter can up-convert the second frequency source signal $S_2$ to a third frequency source signal for transmission at the transmitter 206 and can down-convert a third frequency reflected signal received at the receiver 208 to obtain the second frequency reflected signal $S_2$.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of detecting a parameter of an object, comprising:
   obtaining a first frequency source signal within a first frequency range;
   generating a plurality of harmonic signals from the first frequency source signal;
   generating a second frequency source signal within a second frequency range by selecting from the plurality of harmonic signals a harmonic signal within the second frequency range as the second frequency source signal;
   generating a reference signal within a third frequency range from the first frequency source signal by selecting from the plurality of harmonic signals another harmonic signal within the third frequency range as the reference signal, wherein the second frequency range is greater than the first frequency range and the third frequency range is between the first frequency range and the second frequency range;
   generating a first frequency reflected signal within the first frequency range from a second frequency reflected signal within the second frequency range by combining the reference signal with the second frequency reflected signal, wherein the second frequency reflected signal is indicative of a reflection of the second frequency source signal from the object; and
   determining the parameter of the object from the first frequency reflected signal.

2. The method of claim 1, wherein the first frequency reflected signal is a difference signal obtained by multiplication of the reference signal and the second frequency reflected signal.

3. The method of claim 1, wherein the first frequency source signal is a linear frequency modulation (LFM) signal in the first frequency range bounded by a lower bound frequency $B_1$ and an upper bound frequency $B_2$, the second frequency source signal is an LFM signal in the second frequency range bounded by $N*B_1$ and $N*B_2$, and the reference signal is an LFM signal in the third frequency range bounded by $(N-1)*B_1$ and $(N-1)*B_2$.

4. The method of claim 1, wherein the parameter of the object is at least one of: (i) a range of the object; (ii) a relative radial velocity of the object; (ii) an azimuthal location of the object; and (iv) an elevation of the object.

5. A radar system for a vehicle, comprising:
   a base radar for generating a first frequency source signal within a first frequency range and receptive to a first frequency reflected signal within the first frequency range, the base radar configured to determine a parameter of an object from the first frequency reflected signal; and
   a frequency converter configured to convert the first frequency source signal to a second frequency source signal within a second frequency range, generate a reference signal within a third frequency range from the first frequency source signal, and convert a second frequency reflected signal within the second frequency range to the first frequency reflected signal by combine the reference signal with the second frequency reflected signal to generate the first frequency reflected signal, wherein the second frequency range is greater than the first frequency range and the third frequency range is between the first frequency range and the second frequency range;
   wherein the frequency converter further comprises an amplifier circuit configured to generate a plurality of harmonic signals from the first frequency source signal, a filter circuit configured to apply a first filter to the plurality of harmonic signals to select an $N^{th}$ harmonic signal in the second frequency range as the second frequency source signal and a reference signal circuit configured to apply a second filter to the plurality of harmonic signals to select an $(N-1)^{th}$ harmonic signal within the third frequency range as the reference signal.

6. The radar system of claim 5, wherein the first frequency reflected signal is a difference signal obtained by multiplying the reference signal and the second frequency reflected signal.

7. The radar system of claim 5, wherein the first frequency source signal is a linear frequency modulation (LFM) signal in the first frequency range bounded by a lower bound frequency $B_1$ and an upper bound frequency $B_2$, the second frequency source signal is an LFM signal in the second frequency range bounded by $N*B_1$ and $N*B_2$, and the reference signal is an LFM signal in the third frequency range bounded by $(N-1)*B_1$ and $(N-1)*B_2$.

8. The radar system of claim 5, wherein the parameter of the object is at least one of: (i) a range of the object; (ii) a relative radial velocity of the object; (ii) an azimuthal location of the object; and (iv) an elevation of the object.

9. A vehicle, comprising:
   a base radar for generating a first frequency source signal within a first frequency range and receptive to a first frequency reflected signal within the first frequency range, the base radar configured to determine a parameter of an object from the first frequency reflected signal; and
   a frequency converter configured to convert the first frequency source signal to a second frequency source signal within a second frequency range, generate a reference signal within a third frequency range from the first frequency source signal, and convert a second frequency reflected signal within the second frequency range to the first frequency reflected signal by and to combine the reference signal with the second frequency reflected signal to generate the first frequency reflected signal, wherein the second frequency range is greater than the first frequency range and the third frequency range is between the first frequency range and the second frequency range;

wherein the frequency converter further comprises an amplifier circuit configured to generate a plurality of harmonic signals from the first frequency source signal, a filter circuit configured to apply a first filter to the plurality of harmonic signals to select an $N^{th}$ harmonic signal in the second frequency range as the second frequency source signal and a reference signal circuit configured to apply a second filter to the plurality of harmonic signals to select an $(N-1)^{th}$ harmonic within the third frequency range as the reference signal.

10. The vehicle of claim 9, wherein the first frequency reflected signal is a difference signal obtained by multiplying the reference signal and the second frequency reflected signal.

11. The vehicle of claim 9, wherein the first frequency source signal is a linear frequency modulation (LFM) signal in the first frequency range bounded by a lower bound frequency $B_1$ and an upper bound frequency $B_2$, the second frequency source signal is an LFM signal in the second frequency range bounded by $N*B_1$ and $N*B_2$, and the reference signal is an LFM signal in the third frequency range bounded by $(N-1)*B_1$ and $(N-1)*B_2$.

* * * * *